(No Model.) 5 Sheets—Sheet 3.
G. A. & J. G. XANDER.
SEWING MACHINE.
No. 401,989. Patented Apr. 23, 1889.
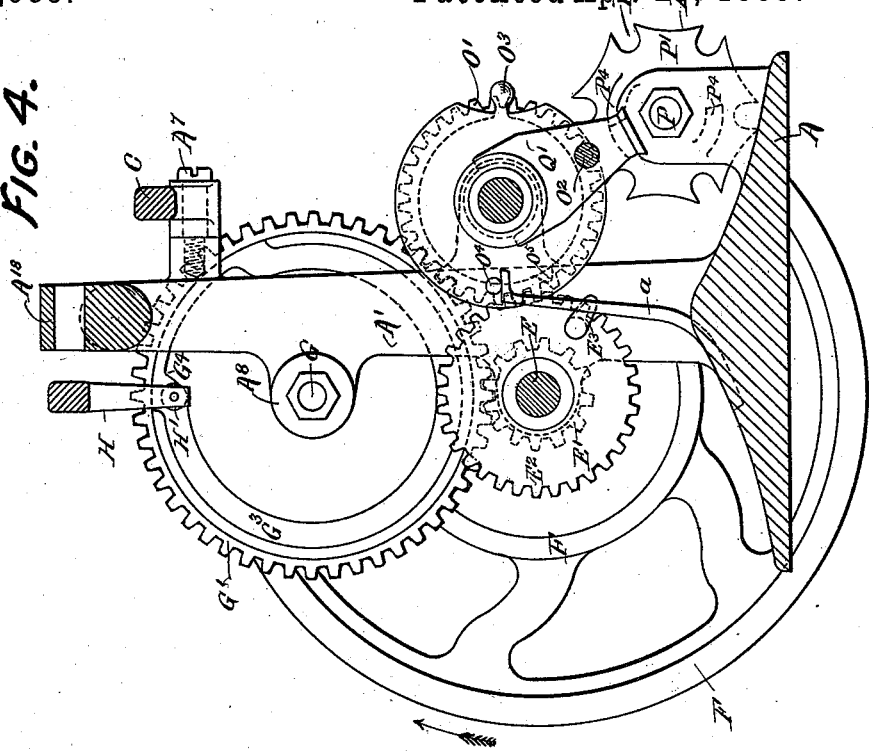
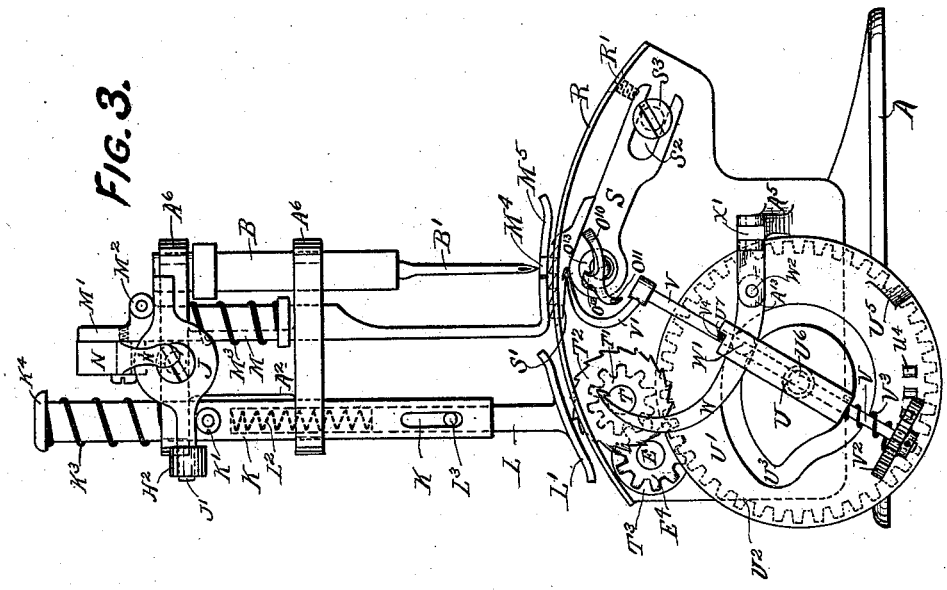
WITNESSES
C. J. Dwight.
J. J. Potts.
George A. Xander  } INVENTORS
John G. Xander  }
By W. G. Stewart
their Attorney (No Model.)
G. A. & J. G. XANDER.
SEWING MACHINE.
No. 401,989. Patented Apr. 23, 1889.
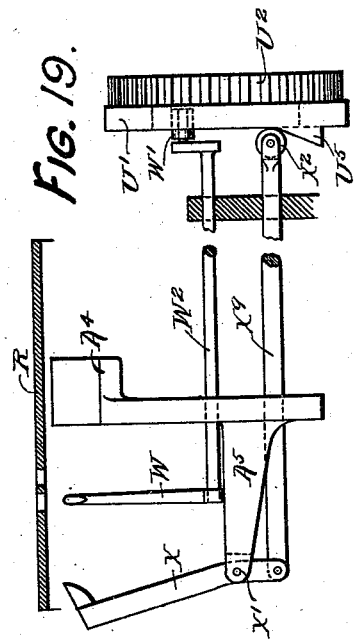
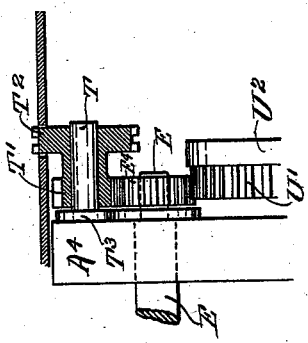
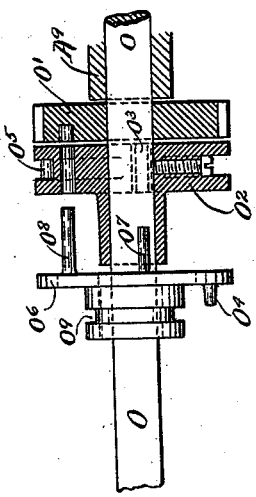
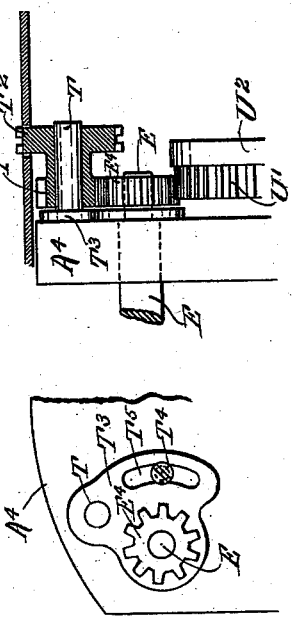
WITNESSES
George A. Xander
John G. Xander
INVENTORS
By their Attorney (No Model.)　　　G. A. & J. G. XANDER.　　5 Sheets—Sheet 5.
SEWING MACHINE.
No. 401,989.　　　　　　　　　Patented Apr. 23, 1889.
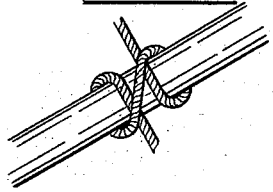
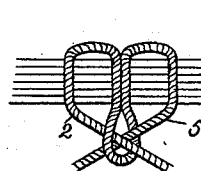
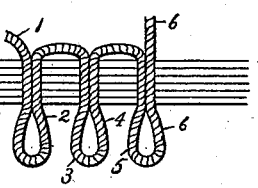
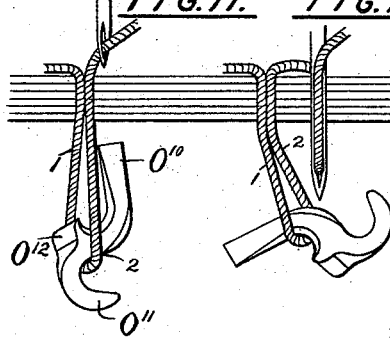
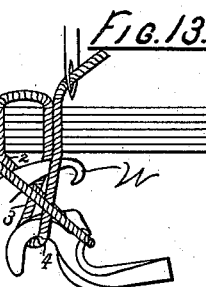
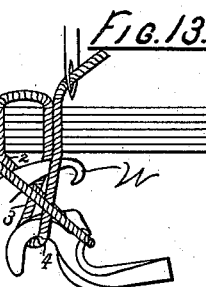
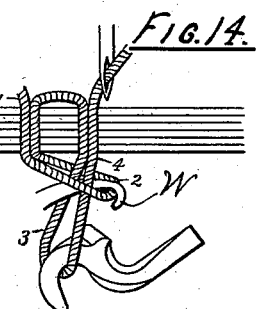
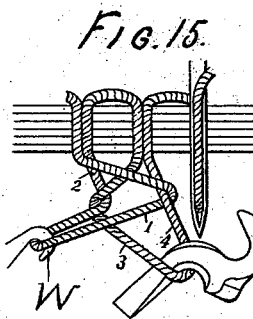
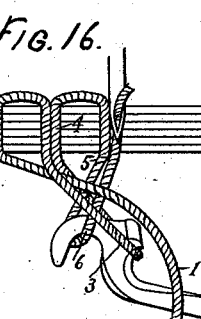
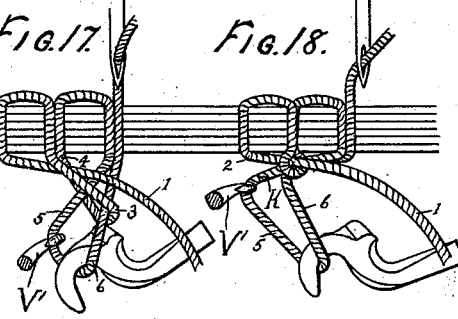
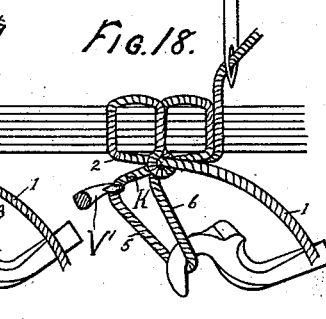
WITNESSES
C. J. Dwight.
Ida F. Kinsey.
George A. Xander
John G. Xander
INVENTORS
By W. J. Stewart Attorney

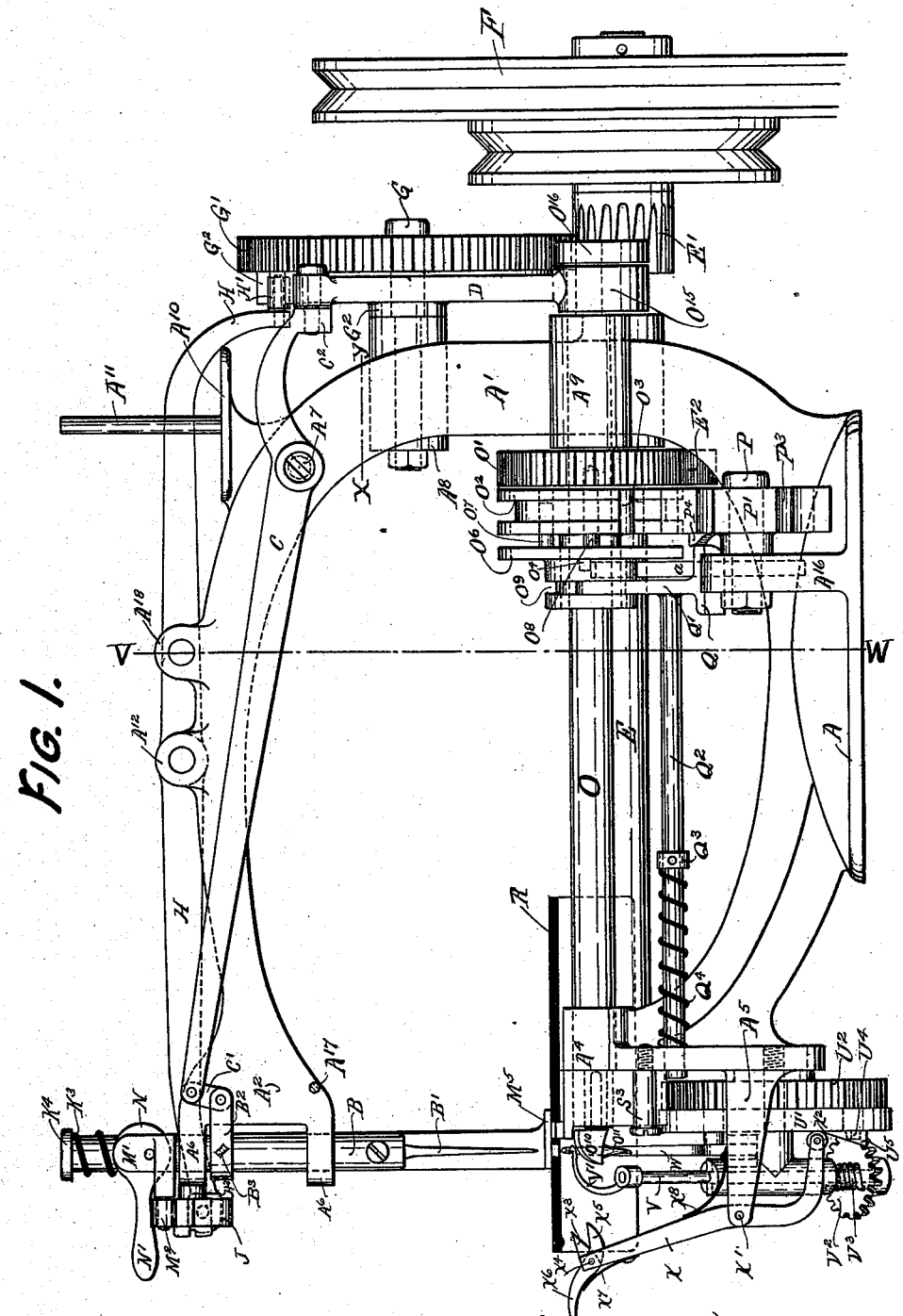

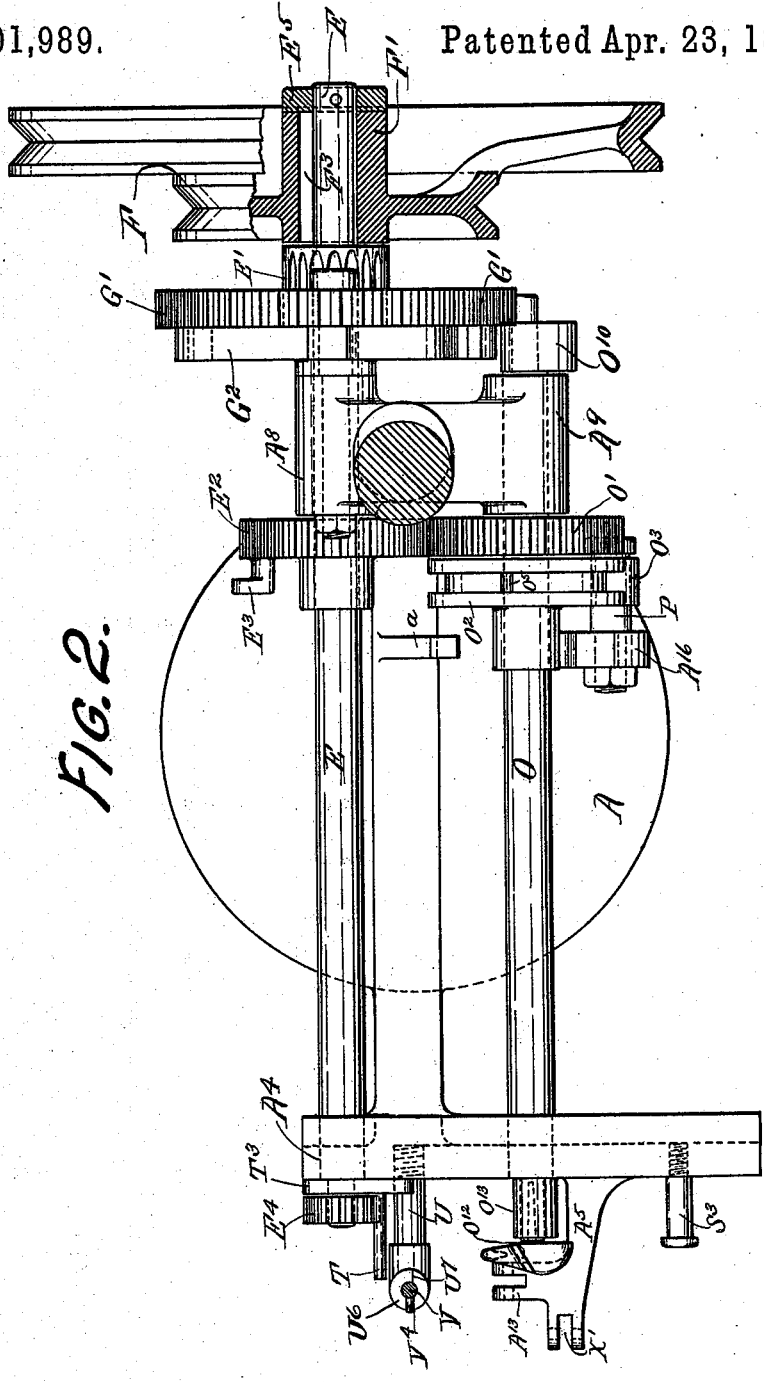

UNITED STATES PATENT OFFICE.

GEORGE A. XANDER, OF HAMBURG, AND JOHN G. XANDER, OF READING, PENNSYLVANIA.

SEWING-MACHINE.

SPECIFICATION forming part of Letters Patent No. 401,989, dated April 23, 1889.

Application filed September 5, 1888. Serial No. 284,665. (No model.)

*To all whom it may concern:*

Be it known that we, GEORGE A. XANDER, residing at Hamburg, and JOHN G. XANDER, residing at Reading, both in the county of Berks and State of Pennsylvania, have invented certain new and useful Improvements in Sewing-Machines; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of this invention is to produce a sewing-machine adapted to form a series of independent stitches separated from each other a greater or less distance, the operation being continuous, and the thread, which is fed from a spool, being parted after each successive stitch is completed.

The machine is intended more particularly to be used in the manufacture of hats, as in securing the bands, but may also be applied to the sewing of pamphlets and other similar work.

The style of stitch for which the machine is especially adapted and the method of forming it are more fully and particularly described and claimed in our previous application, Serial No. 273,297, filed May 28, 1888.

In the drawings, Figure 1 represents a full side elevation of the complete machine. Fig. 2 is a plan representing the upper portion of the machine, cut away at X Y of Fig. 1, and showing the relative arrangement of the main parts of the machine cleared of much of the detail. Fig. 3 is a full view of the needle end of the machine with all parts in place except the thread-cutter. Fig. 4 is a cross-section through V W of Fig. 1. Fig. 5 shows the means employed to connect the belt-wheel to the main shaft, by which the turning of the latter in the wrong direction is prevented. Fig. 6 shows in detail the adjustable spacing feed mechanism. Fig. 7 shows in detail the special form of clutching device employed to effect the intermittent motion of the looper-shaft. Figs. 8 to 18 are duplicates of those used in our previous application before referred to. Fig. 8 shows the principle of the stitch for which our machine is especially adapted in the well-known "clover-hitch" or "waterman's knot." Fig. 9 shows the stitch before tightening; and Fig. 10, the successive loops required in making this stitch as illustrated in the remaining figures, each thread being correspondingly numbered in all the figures, so as to clearly indicate each step in the formation of the stitch. Fig. 19 shows an alternative method of operating the hooks and cutter shown in Figs. 1 and 3.

In marking the several parts of the machine the letters generally indicate main pieces—such as the frame or a shaft—and the same letters with numbers attached designate the different details or features of construction connected with such main pieces.

A represents the base of the frame of the machine, from one side of which the main arm $A'$ extends upward and forward, terminating in the guide-heads $A^6$, in which the needle-bar B and presser-bars K and M are movably held. Another arm, $A^3$, terminates in the head $A^4$, which supports one end of the main shaft E and looper-shaft O, and to which the cloth-plate R is secured. It also carries the hooking, cutting, and feeding devices, hereinafter described.

The belt-wheel F is on one end of the main shaft E, and a cog-wheel, $E^2$, secured to it, gears with a similar wheel, $O'$, running loose on the looper-shaft O between the bearing $A^9$ and a fixed wheel, $O^2$. A clutch, $O^6$, with grooved hub $O^9$, has guide-pins $O^7$ and a clutch-pin, $O^8$, projecting from one face and entering corresponding perforations in the fixed wheel $O^2$. The clutch-pin $O^8$ is long enough to project through this wheel when the face of the clutch is in contact with it and to enter the cog-wheel $O'$, which, when thus connected with the fixed wheel, is bound to carry the shaft O with it when rotated by the main shaft through $E^2$. However, if the clutch is moved longitudinally far enough to withdraw the clutch-pin $O^8$ from the cog-wheel $O'$, the latter will be rotated idly on its shaft. The pins $O^7$ and $O^8$ remain constantly in the fixed wheel $O^2$, though in Fig. 7 they are represented as withdrawn entirely from engagement with the latter, in order to show the separate parts more clearly.

To effect automatically the periodical stoppage of the shaft O while the main shaft E rotates continuously, mechanism involving to some extent the principle of the so-called "Geneva stop-movement" is employed. The fixed wheel $O^2$ is provided with a tooth, $O^3$, recessed in its convex surface, which engages with notches $P^3$, formed in the wheel $P'$, which turns loosely on a stud, P, secured to a bracket, $A^{16}$, on the base A. Between notches the surface of this wheel is concaved to correspond with the convex surface of the fixed wheel $O^2$. For each rotation of the latter the wheel $P'$ is turned one notch by the cog $O^3$. Six of these notches are shown, and one face of the wheel is provided with two opposite inclined pads, $P^4$. As the wheel is rotated, these pads alternately come in contact with the base Q of the clutch-lever, the fingers $Q'$ of which engage the grooved hub $O^9$ of the clutch, while the rod $O^2$ extends forward into the head $A^4$ of the frame in which it is guided, and the base Q slides in a guide formed in the top of the bracket $A^{16}$. As the pads engage the base Q the clutch-pin $O^8$ is thrown out of engagement with the wheel $O'$, and the latter is turned on the shaft O some distance, while the base Q rests upon the top of the inclined pad. A side tooth, $E^3$, on the wheel $E^2$ then comes in contact with another recessed cog, $O^5$, on the fixed wheel $O'$, and turns it and the wheel $P'$ enough to allow the pad $P^4$ to clear the base Q and to bring the side pin, $O^4$, on the clutch against the rest $a$, which is secured to the frame. The function of the side tooth, $E^3$, pin $O^4$, and rest $a$ is to move the wheel $P^2$, so that the pad $P^4$ on said wheel may be moved to clear the base Q of the clutch-lever, thus permitting the rod $Q^2$ to be moved by the spring $Q^4$, so as to cause the engagement of the fixed wheel $O^2$ with the loose gear-wheel $O'$ when the holes in said wheels come into line by forcing the pin $O^8$ into the hole in wheel $O'$. As thus arranged it will be seen that the shaft O is rotated during three revolutions of the main shaft and stopped during the fourth.

Vertical motion is imparted to the needle-bar B from the shaft O by means of an eccentric, $O^{15}$, and rod D, connected at $C^2$ to the needle-bar lever C, which is pivoted to the frame at $A^7$ and to the needle-bar by links $C'$. The rotary hook or looper $O^{10}$ is secured to the opposite end of the shaft O, and between the looper and the head $A^4$ of the frame is a small eccentric, $O^{13}$, which operates a "four-motion feed," consisting of a bar, S, the bifurcated end $S^2$ of which is movably supported on the stud $S^3$, while the serrated feed $S'$ enters an opening in the cloth-plate R.

Recurring to the main shaft E, it will be seen that the pinion $E'$ gears into a cog-wheel, $G'$, which turns on a stud, G, projecting from the lug $A^8$. The projecting face $G^2$ of the wheel $G'$ serves as a cam, by means of which motion is conveyed through the roller $H'$ to the lever H, which is pivoted intermediately to the arm $A'$ at a point, $A^{12}$, and its opposite end is jointed to the extended rocker-bar J. This rocker-bar is pivoted centrally to the upper guide-head, $A^6$, and has one arm under the roller $M^2$, which projects from the stitch-feed presser-bar M, while the opposite bar is above the roller $K'$, which projects in a similar manner from the spacing-feed presser-bar K. A spring, $M^3$, tends to raise the bar K, so that the rocking motion of the lever H produced by the revolution of the cam-wheel $G^2$ will by one movement lower the bar K and simultaneously raise the bar M, and by the opposite or upward movement allow the springs $K^3$ and $M^3$ to return them to their normal positions. The spring $M^3$ allows the presser-foot $M^5$ to adjust itself to varying thicknesses of material; but to accomplish the same object with the bar K the presser-foot $L'$ is made a separate piece, the shank L of which enters the hollow bar K, and is backed by a spiral spring, $L^2$, which tends always to depress the foot. The movement of the latter is limited by the projecting pin $L^3$, guided by the slot $K^2$. The bar M can be lifted vertically independently of the rocker-bar J by means of the ordinary cam-lever, N $N'$, which is pivoted eccentrically to the top $M'$ and rests upon the upper surface of the guide-head $A^6$.

It is evident that the spring $K^3$ may be omitted and the roller $K'$ made to work in an oblong opening in one arm of the rocker-bar J, which latter will thus positively raise as well as lower the presser-bar K, the supplemental spring $L^2$ permitting the lower part, L, to adjust itself to different thicknesses of material.

The opposite end of the main shaft E projects through the head $A^4$ of the frame, and also through a plate, $T^3$, which is strung loosely upon it and has a pinion, $E^4$, secured at its extremity. This plate is provided with a projecting stud, T, upon which the combined cog-wheel $T'$ and feed-wheel $T^2$ is placed and is rotated by the pinion $E^4$. The diameter of this feed-wheel determines the space between stitches, and in order to vary this, if desired, the plate $T^3$, which carries it, is made adjustable on the shaft E, around which it has a limited movement and is held by the set-screw $T^4$, passing through the concentric slot $T^5$. The pinion $E^4$ also gears with the cog-wheel $U^2$, in the projecting face $U'$ of which is formed a cam which operates the draw-hook W, the latter being provided with an intermediate roller, $W'$, which runs in the groove of the cam, and also being pivoted at its end to the jaw $A^{13}$, formed on the projecting bracket $A^5$. Teeth $U^4$ on the same face operate the tightening or take-up hook $V'$ by gearing with the cog-wheel $V^2$ on the opposite end of its inclined shaft V. This shaft turns in a bearing, $U^6$, which is represented as secured to the stud U, on which the wheel U' U² rotates. When the teeth U⁴ engage the cog-wheel V², the hook V' is thrown in toward the looper; but as soon as it is released by the passage of the teeth U⁴ the coiled spring V³ restores it with a jerk to its normal position, which is regulated by the stop V⁴.

A thread-cutter pivoted at X' to the bracket A⁵ is also operated by the cam-wheel U' by means of the inclined pad U⁵, projecting from the face of the cam. This cutter is in the form of a scissors, the fixed blade X³ being about at right angles to its extended shank X, which, after being fulcrumed at X', as above noted, is bent in toward the cam-face and provided with a roller, X², which is kept in contact with said cam-face by means of a spring, X⁸, which presses the cutter away from the looper. The other blade of the scissors, X⁵, is pivoted at X⁴, and its shank X⁶ is carried above and beyond the fixed blade X³ and is pressed upon by the spring X⁷, which tends to keep the scissor-blades apart. When the inclined pad U⁵ strikes the roller X², however, the cutter is rocked upon the pivotal point X' and the scissors are thrown in toward the looper. As they approach it the shank X⁶ of the free blade X⁵ comes in contact with a lug on the under side of the cloth-plate R, and the blades are closed at the proper time upon the thread which it is desired to cut.

In operating the machine the spool of thread is placed upon the spool-pin A¹¹ and the end carried through a tension device (not shown) on lug A¹⁸, the eyes B³ and A¹⁷, and finally through the needle B'. Supposing the machine to be in proper position to start a stitch, the material on the cloth-plate and the presser-foot M⁵ lowered by means of the cam-lever handle N', the revolution of the belt-wheel in the direction indicated by the arrow in Fig. 4 will rotate both the shafts O and E and operate all their connections, the needle will pierce the material, the point O¹¹ of the rotating looper will seize and retain the bight of the thread while the needle returns, the four-motion feed will move the material for the second passage of the needle, and the bight will be again seized by the point O¹¹ of the looper and carried through the first-formed loop, Fig. 13, which by the rotation of the looper has meanwhile been twisted half around and is held only by the cast-off O¹². The draw-hook W is now brought into play by the rotation of the cam-wheel U', seizes the first loop as it is released from the cast-off, Fig. 14, and in returning to its normal position destroys the first loop by drawing the end of the thread marked 1 in Fig. 8 through the material and the second-formed loop, Fig. 15, the material meanwhile being fed onward and a third passage of the needle made. The bight is again caught by the point O¹¹ of the looper and passed through the second-formed loop, Fig. 16, which latter is likewise released from the cast-off by the continued rotation of the looper. The counter-shaft O is now thrown out of engagement with the main shaft E by the movement of the clutch O⁶, as previously described, and the needle, looper, and stitch-feed, which are operated by the counter-shaft, remain at rest, while the take-up-hook shaft V is now turned by the engagement of the cog-wheel V² by the teeth U⁴, and the hook V' is swung into position and seizes the thread 5 of the third-formed loop, Fig. 18, which is jerked forward by the spring V³ on the release of the cog-wheel V², thus tightening the second loop and locking the threads which have been passed through it, the tension of the thread from the spool being sufficient to prevent it from being drawn out by this sudden jerk instead of tightening the second loop, as desired. The thread 5 is now held taut by the hook V', as shown in Fig. 9, and the thread-cutter X is thrown into position, as before described, parts the thread at a point, K, Fig. 18, and is withdrawn, as the roller X², having escaped the highest point of the inclined pad U⁵, is pressed back against the face of the cam. The projection G⁴ of the cam-wheel G² now strikes the roller H' and raises the lever H, the opposite end of which is depressed and rocks the pivoted bar J, thus raising the presser-bar M and removing the pressure of the foot M⁵, and at the same time lowering the presser-bar K, the foot L' of which is thus made to press the material against the feed-wheel T², the supplemental spring L² accommodating itself to varying thicknesses of material. The rotary feed now becomes effective and moves the material ahead until the roller H' has passed the projection G⁴ and dropped to its normal position, thus raising the presser-foot L' and lowering M⁵ ready for a repetition of the above operation. While the material is being thus moved ahead for the next stitch, the parted end of the thread is pulled through it and remains with the needle leaving the finished stitch.

The cam-wheel G² makes one revolution to four of the main shaft and operates the presser-feet through the lever H during the stoppage of the looper-shaft O and its connections, which occurs, as before stated, during every fourth turn of the main shaft, the other three turns making the three passes of the needle required for the described form of stitch. If a stitch is desired which requires but two passes of the needle, the notched wheel P' can be provided with three inclined pads, P⁴, and thus stop the shaft O during every third turn of the main shaft, and the proportions of the gearing be changed accordingly.

Fig. 11 shows an alternative arrangement for operating the mechanism shown in Fig. 3 below the cloth-plate R, which may be adopted in order to keep the machinery as much as possible at one end of the machine, where it may be more easily protected from dirt. The cam-wheel U' is placed nearer the belt-wheel, and its motions are conveyed to the hooks and thread-cutter through connecting-shafts, such as $W^2$ and $X^9$, the former being in torsion, the latter in compression.

Having thus fully described our machine and its operation, what we claim as new and of our invention is as follows:

1. In a sewing-machine having a single reciprocating needle, the combination, with two separate feeding devices located under the cloth-plate, with their feeding-surfaces projecting through the same, of separate presser-feet located above said feeding devices and mechanism, substantially as described, for raising said presser-feet alternately, substantially as and for the purpose set forth.

2. In a sewing-machine, the combination, with the two separate feeding devices located under the cloth-plate, of separate presser-feet located above said devices, a rocker-bar with opposite arms engaging said presser-feet, substantially as described, mechanism for vibrating said rocker-arm, and a lever adapted to operate one of said presser-feet independently, all arranged substantially as set forth.

3. In a sewing-machine, the combination, with the two separate feeding devices located under the cloth-plate, of separate presser-bars K and M, located above said feeding devices, said bar K consisting of two parts, one of which has a limited movement in the other and is depressed therein by a spring, separate springs $K^3$ and $M^3$, adapted to raise the bar K and to depress the bar M, and mechanism, as rocker-bar J, for simultaneously raising one presser-bar and depressing the other, substantially as set forth.

4. In a sewing-machine, the combination, with a presser-bar and a rotating shaft, E, with cog-wheel $E^4$, of a feeding device located under said bar, and consisting of a plate loosely supported on said shaft and provided with a stud, T, and a combined cog and feed wheel removably supported on said stud and engaging the wheel $E^4$, said plate being adjustably fastened to the machine, all substantially as and for the purpose set forth.

5. In a sewing-machine, the spacing-feed $T^2$ and the presser-foot mechanism, both operated by a continuously-rotating shaft, E, and connected mechanism, substantially as described, in combination with a stitch-feed, S′, a needle, and a looper, all operated by a shaft, O, and connected mechanism, substantially as described, said shaft O being intermittently rotated by said shaft E, substantially as and for the purpose set forth.

6. In a sewing-machine, the combination, with a continuously-rotating main shaft and a spacing-feed, $T^2$, and presser-bars K and M, operated thereby, as set forth, of a counter-shaft, O, carrying a feed, S′, and a rotary looper, a needle-bar operated by said counter-shaft, as set forth, and mechanism, as wheels $O^2$, O′, and P′, and clutch $O^6$, for regularly engaging and disengaging said counter-shaft, all substantially as and for the purpose set forth.

7. In a sewing-machine, the combination, with a reciprocating needle, a rotary looper, and a feeding device, of a draw-hook, W, pivoted below said looper and having a curved hook end, substantially as set forth, and mechanism for vibrating the same, whereby a loop formed on said looper is drawn through a later-formed loop, substantially as set forth.

8. In a sewing-machine, the combination, with a reciprocating needle, a rotary looper, a feeding device, and a draw-hook, of an oscillating take-up hook, V′, located below said looper, and mechanism for operating the same, substantially as described, whereby a stitch formed by said machine is tightened, substantially as and for the purpose set forth.

9. In a sewing-machine, the combination, with a reciprocating needle, a rotary looper, a feeding device, a take-up hook, V′, and mechanism for operating said parts, substantially as described, of a thread-cutter pivoted below said looper and means, substantially as described, for vibrating the same in an approximately-vertical plane, whereby the thread is cut while held taut by said take-up hook, substantially as set forth.

10. In a sewing-machine, the combination of a reciprocating needle, a rotary looper, a feeding device, a draw-hook, W, a take-up hook, V′, and a vibrating cutter, all arranged and operated substantially as set forth.

11. In a sewing-machine, the combination of a needle, the looper, the stitch-feed S′, the draw-hook, the take-up hook, and the cutter, with a separate feed, $T^2$, to regulate the space between stitches, and mechanism for operating the same, all arranged substantially as and for the purpose set forth.

12. In a sewing-machine, the combination of a needle, the looper, the stitch-feed S′, the draw-hook, and the take-up hook, with a separate feed, $T^2$, to regulate the space between stitches, and mechanism for operating the same, all arranged substantially as and for the purpose set forth.

13. In a sewing-machine, the combination, with the needle, the looper, and the stitch-feed, of the rotating cam-disk U′ and the draw-hook W, pivoted to the machine and operated by said cam, substantially in the manner and for the purpose set forth.

14. In a sewing-machine, the combination, with a reciprocating needle, a rotary looper, and a feeding device, all operated by an intermittently-rotating shaft, substantially as described, and with a draw-hook, W, of the take-up hook and mechanism arranged to operate it while said needle, looper, and feeding device are at rest, substantially as and for the purpose set forth.

15. In a sewing-machine, the rotating disk U′, with teeth $U^4$, in combination with the take-up hook V′, its shaft V, pinion $V^2$, spring $V^3$, stop $V^4$, and bearing $U^6$, all arranged substantially as set forth.

16. The combination, with a needle, a looper, and a feeding device, of the draw-hook W, the take-up hook V', the thread-cutter, and the rotating cam-disk U', engaging said draw-hook, take-up hook, and thread-cutter, substantially as described, and all arranged to operate substantially in the manner set forth.

17. In a sewing-machine, the combination, with the presser-bars K and M, the feeds $T^2$ and S', and the rocker-bar J, engaging said presser-bars, of a pivoted lever, H, connected to said rocker-bar and operated by a cam, $G^3$ $G^4$, substantially as and for the purpose set forth.

18. In a sewing-machine, the combination, with the two separate feeding devices located under the cloth-plate, of separate presser-bars K and M, located above said feeding devices, said bar K consisting of two parts, one of which has a limited movement in the other and is depressed therein by a spring, a separate spring adapted to depress the bar M, and a rocker-bar mechanism, substantially as described, for simultaneously raising one presser-bar and depressing the other, substantially as set forth.

In testimony whereof we affix our signatures in presence of two witnesses.

GEO. A. XANDER.
JOHN G. XANDER.

Witnesses:
CHAS. F. SHAPPELL,
JACKSON LEVAN.